United States Patent [19]
Lund et al.

[11] Patent Number: 6,145,608
[45] Date of Patent: *Nov. 14, 2000

[54] SUPERHARD CUTTING STRUCTURE HAVING REDUCED SURFACE ROUGHNESS AND BIT FOR SUBTERRANEAN DRILLING SO EQUIPPED

[75] Inventors: Jeffrey B. Lund; Redd H. Smith, both of Salt Lake City; Trent N. Butcher, Midvale, all of Utah

[73] Assignee: Baker Hughes Incorporated, Houston, Tex.

[ * ] Notice: This patent is subject to a terminal disclaimer.

[21] Appl. No.: 09/413,620

[22] Filed: Oct. 6, 1999

Related U.S. Application Data

[63] Continuation of application No. 08/872,207, Jun. 10, 1997, Pat. No. 5,967,250, which is a continuation of application No. 08/480,623, Jun. 7, 1995, Pat. No. 5,653,300, which is a continuation-in-part of application No. 08/156,086, Nov. 22, 1993, Pat. No. 5,447,208.

[51] Int. Cl.$^7$ .................................. E21B 10/46; B23P 9/00
[52] U.S. Cl. .......................... 175/428; 175/434; 407/119
[58] Field of Search ........................ 175/428, 432, 175/433, 434; 407/119

[56] References Cited

U.S. PATENT DOCUMENTS

| | | |
|---|---|---|
| 3,670,380 | 6/1972 | Moore et al. . |
| 4,109,737 | 8/1978 | Bovenkerk . |
| 4,211,508 | 7/1980 | Dill et al. . |
| 4,478,297 | 10/1984 | Radtke . |
| 4,525,179 | 6/1985 | Gigl . |
| 4,533,004 | 8/1985 | Ecer . |
| 4,539,018 | 9/1985 | Whanger et al. . |
| 4,566,426 | 1/1986 | Schleich et al. . |
| 4,606,418 | 8/1986 | Thompson . |
| 4,629,373 | 12/1986 | Hall . |
| 4,646,857 | 3/1987 | Thompson ............................... 175/329 |
| 4,693,035 | 9/1987 | Doyle . |

(List continued on next page.)

FOREIGN PATENT DOCUMENTS

| | | |
|---|---|---|
| 0 149 530 | 7/1985 | European Pat. Off. . |
| 0 298 729 A1 | 7/1988 | European Pat. Off. . |
| 0 322 214 B1 | 12/1988 | European Pat. Off. . |
| 0 480 394 | 4/1992 | European Pat. Off. . |
| 0 541 071 | 5/1993 | European Pat. Off. . |
| 4141900 A1 | 6/1993 | Germany . |
| 4240053 A1 | 6/1993 | Germany . |

(List continued on next page.)

OTHER PUBLICATIONS

Copy of two page brochure from Coborn Engineering Company Ltd. (undated).
Three pages of photocopied photographs of hammers.
Copy of letter w/attachments from Mark R. Benenti of Hommell America Inc. to Gerald Angst of Hycalog dated Dec. 18, 1995, 8 pages.
Copy of a letter dated Nov. 15, 1995 from Bill Short of Bit & Tool to David Hall of Novatek.
Copy of five pages of information from EWAG Corporation (two pages of undated text and photocopies of photographs and three pages comprising a price list purportedly dated Apr. 1, 1988).

(List continued on next page.)

Primary Examiner—Eileen D. Lillis
Assistant Examiner—Jong-Suk Lee
Attorney, Agent, or Firm—Trask Britt

[57] ABSTRACT

A superhard cutting element having a polished, low friction, substantially planar cutting face with a surface finish roughness of 10 $\mu$in. or less and preferably 0.5 $\mu$in. or less. A chamfered cutting edge and side surface of the superhard material table of the same surface finish roughness are also disclosed. The surface roughness of the aforementioned superhard material table portions may be reduced by mechanically smoothing and polishing according to one of several variations of the method of the invention.

38 Claims, 4 Drawing Sheets

U.S. PATENT DOCUMENTS

| | | |
|---|---|---|
| 4,784,023 | 11/1988 | Dennis . |
| 4,805,586 | 2/1989 | Borse . |
| 4,852,671 | 8/1989 | Southland . |
| 4,858,707 | 8/1989 | Jones et al. . |
| 4,872,520 | 10/1989 | Nelson . |
| 4,883,132 | 11/1989 | Tibbitts . |
| 4,884,476 | 12/1989 | Okuzumi et al. . |
| 4,913,244 | 4/1990 | Trujillo . |
| 4,913,247 | 4/1990 | Jones . |
| 4,954,139 | 9/1990 | Cerutti . |
| 4,976,324 | 12/1990 | Tibbitts . |
| 4,984,642 | 1/1991 | Renard et al. . |
| 4,988,421 | 1/1991 | Drawl et al. . |
| 4,992,082 | 2/1991 | Drawl et al. . |
| 4,997,049 | 3/1991 | Tank et al. . |
| 5,011,509 | 4/1991 | Frushour . |
| 5,011,514 | 4/1991 | Cho et al. . |
| 5,011,515 | 4/1991 | Frushour . |
| 5,025,874 | 6/1991 | Barr et al. . |
| 5,035,771 | 7/1991 | Borse . |
| 5,037,451 | 8/1991 | Burnand et al. . |
| 5,054,246 | 10/1991 | Phaal et al. . |
| 5,115,873 | 5/1992 | Pastusek . |
| 5,120,327 | 6/1992 | Dennis . |
| 5,135,061 | 8/1992 | Newton, Jr. . |
| 5,172,778 | 12/1992 | Tibbitts et al. . |
| 5,184,433 | 2/1993 | Maack . |
| 5,215,415 | 6/1993 | Fukuoka et al. . |
| 5,217,081 | 6/1993 | Waldenström et al. . |
| 5,447,208 | 9/1995 | Lund et al. ............................. 175/428 |
| 5,469,927 | 11/1995 | Griffin .................................... 175/432 |
| 5,504,303 | 4/1996 | Nagy . |
| 5,648,119 | 7/1997 | Grab et al. .......................... 407/119 X |
| 5,653,300 | 8/1997 | Lund et al. ............................. 175/428 |
| 5,669,271 | 9/1997 | Griffin et al. ....................... 175/428 X |
| 5,722,499 | 3/1998 | Nguyen et al. ..................... 175/434 X |
| 5,823,277 | 10/1998 | Delwiche et al. ...................... 175/428 |
| 5,967,250 | 10/1999 | Lund et al. ............................. 175/428 |
| 5,992,549 | 11/1999 | Fuller ................................. 175/432 X |

OTHER PUBLICATIONS

Copy of four pages of a communication from Terry Matthias of Hycalog to Dean Lechtenberger of Arnold, White & Durkee –dated Jan. 9, 1995.

Copy of letter from David Hall of Novatek to Ralph Horton of Baker–Hughes Christensen (sic) (1 page), dated Oct. 24, 1995.

Andersen, E.E., et al., *PDC–Bit Performance Under Simulated Borehole Conditions*, (SPE Paper No. 20412) SPE Drilling & Completion, Sep. 1993, pp. 184–188.

Argon, Ali S., et al., *Mechanical Behavior of Materials*, Massachusetts Institute of Technology, pp. 445 & 461, undated.

Clark, D.A., et al., *Comparison of Laboratory and Field Data for a PDC Bit*, (SPE/IADC Paper No. 13459) SPE/IADC 1985 Drilling Conference, pp. 323–325.

Davis, J.R., *Technical Brief 51: Superabrasives*, ASM Materials Engineering Dictionary, p. 465, 1992.

Field, J.E., *The Properties of Diamond*, pp. 359, 645 & 646, undated.

Hemphill, Terry, et al., Effects of PDC–Bit Selection and Mud Chemistry on Drilling Rates in Shale, (SPE Paper No. 22579) SPE Drilling & Completion, Sep. 1994, pp. 176–184.

Hibbs, L.E., et al., Wear Mechanisms for Polycrystalline Diamond Compacts as Utilized for Drilling in Geothermal Environments, General Electric Company, Corporate Research and Development, Contract Period Nov. 1979 to Sep. 1982, pp. 89–99.

Kuru, E., et al., An Experimental Study of Sliding Friction Between PDC Drill Cutters and Rocks, Int. J. Rock Mech. Min. Sci. & Geomech. Abstr., vol. 32, No. 3, pp. 227–283, 1995.

Pessier, R.C., et al., Quantifying Common Drilling Problems With Mechanical Specific Energy and a Bit–Specific Coefficient of Sliding Friction, (SPE Paper No. 24584) Society of Petroleum Engineers Inc., 1992, pp. 373–388.

Schey, John A., Tribology in Metalworking—Friction, Lubrication and Wear, American Society for Metals, 1983, pp. 573–616.

Simon, R., *Energy Balance in Rock Drilling*, (SPE Paper No. 499) Society of Petroleum Engineers Journal, Dec. 1963, pp. 298–306.

Smith, R.H., et al., Drilling Plastic Formations Using Highly Polished PDC Cutters, (SPE Paper No. 30476) Society of Petroleum Engineers, Inc., 1995, pp. 29–44.

Teale, R., The Concept of Specific Energy in Rock Drilling, Int. J. Rock Mech. Mining Set., vol. 2, 1965, pp. 57–73.

Wampler, Charles, et al., Methodology for selecting PDC bits cuts drilling costs, Oil & Gas Journal, Jan. 15, 1990, pp. 39–44.

Warren, T.M., et al., Laboratory Drilling Performance of PDC Bits, (SPE Paper No. 15617) SPE Drilling Engineering, Jun. 1988, pp. 125–135.

Warren, T.M., et al., Bottomhole Stress Factors Affecting Drilling Rate at Depth, Journal of Petroleum Technology, Aug. 1985, pp. 1523–1533.

Wilks, E.M., The resistance of diamond and other gem stones to abrasion, Clarendon Laboratory University of Oxford UK, undated.

Wilks, John, et al., Properties and Applications of Diamond, Butterworth–Heinemann Ltd., 1991, pp. 290–309.

European Search Report dated Sep. 13, 1996.

VHS–format videotape program produced by the National Research Laboratory, Melbourne, Australia, in cooperation with the National Centre of Tribology, Risley, United Kingdom, directed to metal cutting with a single point machine tool cutter as viewed with an SEM.

European Search Report dated Apr. 29, 1996 re: Application Number EP 94 87 0182 (4 pages).

Song, J.F., et al., Surface Texture, National Institute of Standards and Technology (6 pages), undated.

Moore, D.T., Tutorials in Optics, Ch. 8, Methods for Characterizing Surface Topography, (8 pages), undated.

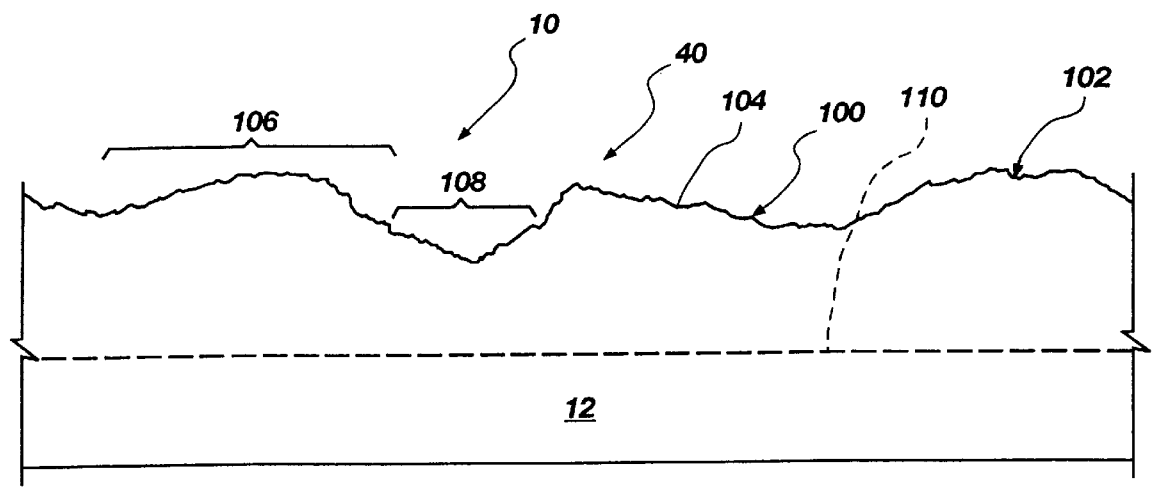
Fig. 5A
*(PRIOR ART)*
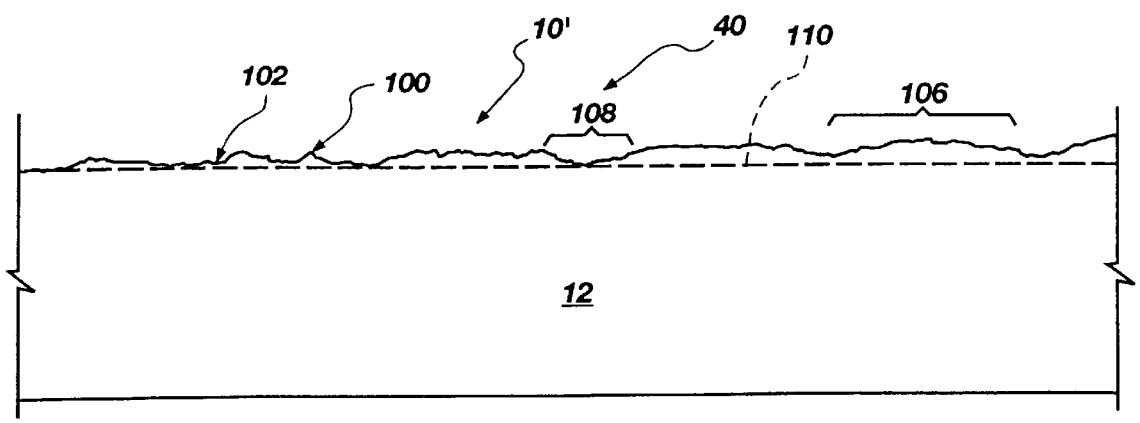
Fig. 5B
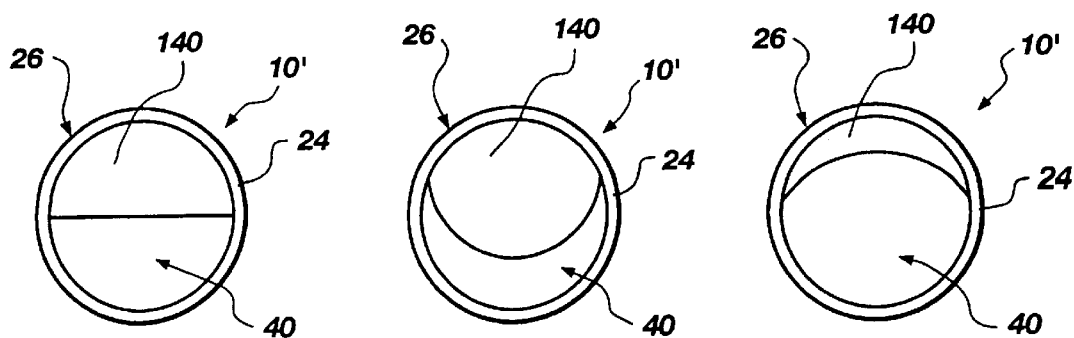
Fig. 6A   Fig. 6B   Fig. 6C

SUPERHARD CUTTING STRUCTURE HAVING REDUCED SURFACE ROUGHNESS AND BIT FOR SUBTERRANEAN DRILLING SO EQUIPPED

CROSS REFERENCE TO RELATED APPLICATION

This application is a continuation of U.S. Patent Application Ser. No. 08/872,207, filed Jun. 10, 1997, now U.S. Pat. No. 5,967,250, which is a continuation of U.S. patent application Ser. No. 08/480,623, filed Jun. 7, 1995, now U.S. Pat. No. 5,653,300, issued Aug. 5, 1997, which is a continuation-in-part of U.S. patent application Ser. No. 08/156,086 filed Nov. 22, 1993, now U.S. Pat. No. 5,447,208, issued Sep. 5, 1995.

BACKGROUND OF THE INVENTION

1. Field of the Invention

The present invention relates generally to cutting elements for use with rotary drag bits and, more specifically, to superhard cutting elements having an extremely smooth finish on at least a portion of the leading surface or cutting face.

2. State of the Art

Superhard cutting elements have been commercially available for over two decades. The typical superhard cutting element employed on rotary drag bits for earth boring comprises a substantially planar, polycrystalline diamond compact (PDC) table supported by a metal substrate, typically of sintered tungsten carbide, although other metals and combinations of metals have been employed over the years. The cutting face on the vast majority of commercially available PDC cutting elements is a planar, circular surface. In state of the art PDC cutting elements, the cutting face is typically lapped to a smooth finish.

In some subterranean formations, PDC cutting elements have been very effective in cutting the formation as the drag bit carrying the cutting elements rotates and the edge of the cutting surface engages the formation. However, in certain formations which fail plastically, such as highly pressured or deep shales, mudstones, siltstones and some limestones, as well as other ductile formations, the formation cuttings have a marked tendency to adhere to the leading surface or cutting face of the cutting element.

When cuttings adhere to the cutting face of a cutting element, they tend to collect and to build up as a mass of cuttings adjacent to the point or line of engagement between the cutting face of the PDC cutting element and the formation, potentially increasing the net effective stress of the formation being cut. This build up of cuttings moves the cutting action away from and ahead of the edge of the PDC cutting element and alters the failure mechanism and location of the cutting phenomenon so that cutting of the formation is actually effected by this built up mass, which obviously is quite dull. Thus, the efficiency of the cutting elements, and hence of the drag bit, is drastically reduced.

Undesired adhesion of cuttings from subterranean formations being drilled by drag bit PDC cutting elements has long been recognized as a problem in the subterranean drilling art. A number of different approaches have been attempted to facilitate removal of formation cuttings from the cutting face of PDC cutting elements. For example, U.S. Pat. No. 4,606,418 to Thompson discloses cutting elements having an aperture in the center thereof which feeds drilling fluid from the interior of the drill bit onto the cutting face to cool the diamond table and to remove formation cuttings. U.S. Pat. No. 4,852,671 to Southland discloses a diamond cutting element which has a passage extending from the support structure of the cutting element to the extreme outermost portion of the cutting element, which is notched in the area in which it engages the formation being cut so that drilling fluid from a plenum on the interior of the bit can be fed through the support structure and to the edge of the cutting element immediately adjacent the formation. U.S. Pat. No. 4,984,642 to Renard et al. discloses a cutting element having a ridged or grooved cutting face on the diamond table to promote the break-up of cuttings of the formation being drilled or, in the case of a machine tool, the material being machined, which enhances their removal from the cutting face. The irregular topography of the cutting face itself assists in preventing balling or clogging of the drag bit by reducing the effective surface or contact area of the cutting faces on the cutting elements, which also reduces the pressure differential of the formation chips being cut. U.S. Pat. No. 5,172,778 to Tibbitts et al., assigned to the assignee of the present application, employs ridged, grooved, stair-step, scalloped, waved and other alternative non-planar cutting surface topographies to permit and promote the access of fluid in the borehole to the area on the cutting element cutting face immediately adjacent to and above the point of engagement with the formation to equalize differential pressure across the formation chip being cut by the cutting element and thus reduce the shear force which opposes chip movement across the cutting surface. U.S. Pat. No. 4,883,132 to Tibbitts, assigned to the assignee of the present application and incorporated herein by reference, discloses a novel drill bit design providing large cavities between the face of the bit and the cutting elements engaging the formation, so that formation cuttings enter the cavity area where they are unsupported and thus more likely to break off for transport up the borehole. Clearing of the cut chips is facilitated by nozzles aimed from behind the cutting elements (taken in the direction of bit rotation) so that the chips are impacted in a forward direction to break off immediately after being cut from the formation. U.S. Pat. No. 4,913,244 to Trujillo, assigned to the assignee of the present invention, discloses bits which employ large cutters having associated therewith directed jets of drilling fluid emanating from specifically oriented nozzles placed in the face of the bit in front of the cutting elements. The jet of drilling fluid is oriented so that the jet impacts between the cutting face of the cutting element and a formation chip as it is moving along the cutting face to peel it away from the cutting element and toward the gage of the bit. U.S. Pat. No. 4,976,324 to Tibbitts, assigned to the assignee of the present invention, discloses diamond-film coated diamond cutting elements of various types such as polycrystalline diamond compact, thermally stable polycrystalline diamond compact (commonly termed TSP's or thermally stable products), Mosaic® cutting elements formed of an array of TSP's, natural diamonds and diamond impregnated cutting elements. The diamond film has a lower porosity or higher purity than the underlying diamond substrate, thus improving the quality, uniformity, and sharpness of the cutting edge of the cutting element, assisting in resisting wear of the cutting element and improving impact resistance of the cutting surface. U.S. Pat. No. 5,115,873 to Pastusek, assigned to the assignee of the present application, discloses yet another manner in which formation cuttings can be removed from a cutting element by use of a structure adjacent and/or incorporated with the face of the cutting element to direct drilling fluid to the face of the cutting element behind the formation chip as it comes off the formation. U.S. Pat. No. 4,988,421 to Drawl et al. discloses a method of toughening the structure of a diamond or diamond-like, coated tool by depositing by low pressure chemical vapor deposition several layers of diamond or diamond-like particles onto a non-diamond or non-diamond-like tool substrate.

None of the foregoing approaches to cutter and bit design have been completely successful in practice in achieving the desired result of facilitating chip removal from the face of the cutting element. Moreover, it will be appreciated by those skilled in the art that all of the foregoing approaches require significant modification to the cutting elements themselves, to the structure carrying the cutting elements on the bit face, and/or to the bit itself. Thus, all of the foregoing approaches to the problem require significant expenditures and substantially raise the price of the drill bit. In addition, due to required cutter placement on certain styles and sizes of bits, many of the prior art hydraulic chip removal arrangements are unsuitable for general application. Accordingly, it would be extremely desirable to provide the industry with a solution to the impairment to the cutting mechanism caused by chip adhesion, which solution could be economically effected on any drill bit regardless of size or style, and regardless of the type of formation which might be expected to be encountered by the drill bit.

SUMMARY OF THE INVENTION

The present invention provides a cutting element including a table of superhard material having a leading surface or cutting face of low or reduced surface roughness in comparison to prior art cutting elements. While the present invention's primary applicability is to polycrystalline diamond compact (PDC) cutting elements having substantially planar diamond tables, the term "substantially planar" is intended and understood to include concave, convex, and other nonlinear diamond table surfaces which nonetheless employ a substantial cutting surface primarily in two dimensions and of any surface shape, topography or geometry to engage and cut the formation. The term "substantially planar" is also intended and understood to encompass cutting elements having grooved, ridged or other non-planar interfaces between the diamond table and the supporting WC substrate.

The superhard cutting element according to the present invention is also intended and understood to include variations of polycrystalline diamond compact and other superhard cutting structures. For example, the term "superhard" includes, without limitation, the previously referenced thermally stable products or TSP's, Mosaic® cutting elements formed from TSP's disposed in a planar array, diamond films and cubic boron nitride compacts, as well as other superhard materials known in the art.

The present invention comprises a superhard cutting element having a substantially planar cutting table providing a surface having a cutting edge for engaging a formation to be drilled by the rotary drag bit upon which the cutting element is mounted. The aforementioned surface, which is generally oriented to comprise the leading surface or cutting face of the cutting element, taken in the direction of bit rotation, is processed to a smoothness far in excess of that normally provided in state of the art, commercially available cutting elements.

In the most preferred embodiment of the present invention, the leading surface or cutting face of the cutting element is mechanically, chemically or otherwise polished substantially to a "mirror" finish in which one can literally see reflections of objects. Reduced perturbation of the polished cutting face lowers the coefficient of friction of the cutting face and greatly reduces adhesion of the formation chips. In addition, such polishing reduces potential fracture nucleation sites or flaw sites in the cutting face.

The significant reduction in adhesion reduces the shear stress or resistance to movement of chips on the cutting face and thus the normal forces, as well as tangential forces required for a specified depth of cut in a specific formation. A reduction in normal forces in real-world terms translates to a reduction in the drill string weight required to be applied to the drill bit down hole or an increase in depth of cut and rate of penetration for a given weight on bit, while a reduction in tangential forces translates in real-world terms to a reduction in the torque required to rotate the bit for a given depth of cut and rate of penetration. The reduction of these cutting forces translates to improved drilling efficiency and improved durability and longevity of the drill bit.

It is also demonstrated that formation chips from formations which fail plastically or which behave in a ductile manner, which are cut by a polished, substantially mirror-finish, superhard cutting element cutting surface under certain drilling conditions, are generally ribbon-like with a substantially uniform thickness and are removed from the formation being drilled in a continuous fashion. This phenomenon is in contrast to the chips cut by a standard superhard cutting element with an unpolished surface under similar conditions, such chips being globular with irregular configuration and building up in a packed mass on a cutting face of the cutting element to a thickness two to three times the thickness of those on the polished cutting face before moving up the cutting face to the bit face and releasing to be removed up hole. Moreover, the polished cutting elements of the present invention achieve a finely machined "kerf" or bottom hole pattern and thus a smoother borehole bottom, lowering bit vibration and chattering and maintaining more continuous contact between the bit face and the bottom of the borehole.

It has also recently been discovered by the inventors that the cutting element of the present invention provides advantages in reduction of cutting energies and increased ROP in non-plastic formations, such as, for example and not by way of limitation, sandstones, limestones and shales. While the exact mechanism of these advantages is not fully understood, laboratory testing of cutting element performance has confirmed its existence.

The invention also contemplates the smoothing and polishing of other portions of a cutting element, such as, for example, one or more chamfers located along at least a portion of the cutting edge of the table of superhard material, as well as the side of the table to the rear of the chamfer. Reduced surface roughness cutting element mounting structures such as studs and bit bodies having selected reduced surface roughness areas such as waterways and junk slots are also included within the ambit of the invention.

The invention further contemplates a method of reducing surface roughness of the cutting faces and other areas, such as the aforementioned chamfers and sides, of the superhard material tables of cutting elements.

BRIEF DESCRIPTION OF THE SEVERAL VIEWS OF THE DRAWINGS

FIG. 5A is an exemplary rendering of a side sectional elevation illustrating the topography of a prior art superhard cutting element cutting face;

FIG. 5B is an exemplary rendering of a side sectional elevation illustrating the topography of a superhard cutting element cutting face according to the present invention;

FIGS. 6A–6C are front elevations depicting cutting elements having polished chamfers and sides and partially polished cutting faces, all according to the present invention;

DETAILED DESCRIPTION OF THE INVENTION

Figure 1:
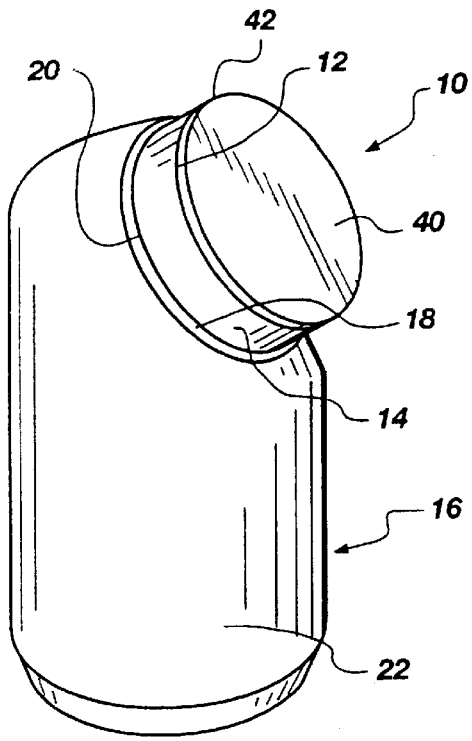
FIG. 1 is a perspective view of one type of typical superhard cutting element having a substantially planar cutting face.

Referring now to FIG. 1 of the drawings, an exemplary superhard cutting element 10 is depicted in perspective view. Cutting element 10, in this instance a PDC, comprises a diamond table 12 supported on an underlying substrate 14, which is typically of sintered tungsten carbide particles or of any other suitable composition. The boundary between diamond table 12 and substrate 14 may be planar, as shown, or may be irregular as illustrated in U.S. Pat. Nos. 4,784,023, 5,011,515, 5,120,327 and 5,351,772, the last of which is assigned to the assignee of the present application and incorporated herein by this reference. The nature or configuration of the boundary between the diamond table 12 and substrate 14 does not, however, form a part of the present invention and so will not be further described.

In use, as mounted on the rotary drag bit, the superhard cutting element 10 is generally supported by an additional carrier structure such as a cylinder or, as shown in FIG. 1, a so-called "stud" 16 having a carrier surface 18 to which the rear surface 20 of substrate 14 is bonded, as by brazing. Stud 16 also includes a free end 22, which is inserted and secured in an aperture drilled or otherwise formed in the face of the rotary drag bit to which the superhard cutting element 10 is to be mounted. Alternatively, the carrier structure 16 may comprise a cylindrical substrate supporting a diamond table, which substrate is brazed into a socket or pocket formed in the face of the rotary drag bit when the bit is fabricated and furnaced, or formed thereafter by milling, drilling or other machining process. Both studs and cylinders are typically formed of materials compatible with that of substrate 14, such as the aforementioned tungsten carbide.

Figure 2:
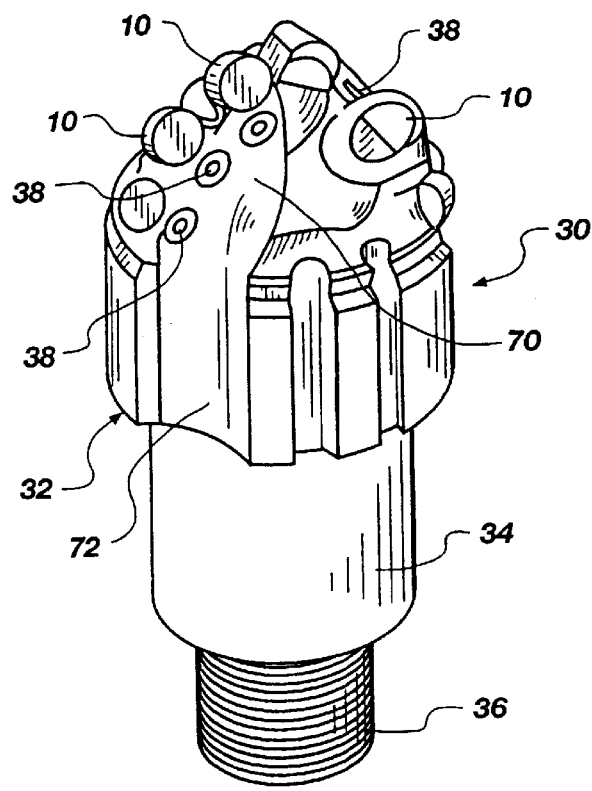
FIG. 2 is a perspective view of a rotary drag bit having PDC cutting elements mounted thereon.

FIG. 2 of the drawings depicts a drill bit 30 having a body 32 secured to a shank 34 having a threaded pin connection 36 thereon, whereby drill bit 30 is made up to the end of a drill string or to a down hole motor disposed at the end of a drill string. PDC cutting elements 10 are shown secured in a predetermined pattern and at predetermined heights and orientations on the face of the drill bit 30 to provide effective cutting for the formation type to be cut, nozzles 38 on body 32 being positioned to clear chips of formation material leaving cutting elements 10.

Returning to FIG. 1, the diamond table 12 of PDC cutting element 10 possesses a leading surface face or cutting face 40, the outermost edge 42 of which (as the cutting element 10 is mounted to the body 32 of drill bit 30) may be defined as the cutting edge 42 by which the cutting element 10 engages and cuts the formation. In PDC cutting elements of the prior art, cutting face or leading face 40 of PDC cutting element 10 would typically be lapped to a surface finish of 20–40 μin. RMS (all surface finishes referenced herein being RMS) which is relatively smooth to the touch and visually planar (if the cutting face is itself flat), but which includes a number of surface anomalies and exhibits a degree of roughness which is readily visible to one even under very low power magnification, such as a 10× jeweler's loupe.

Figure 3:
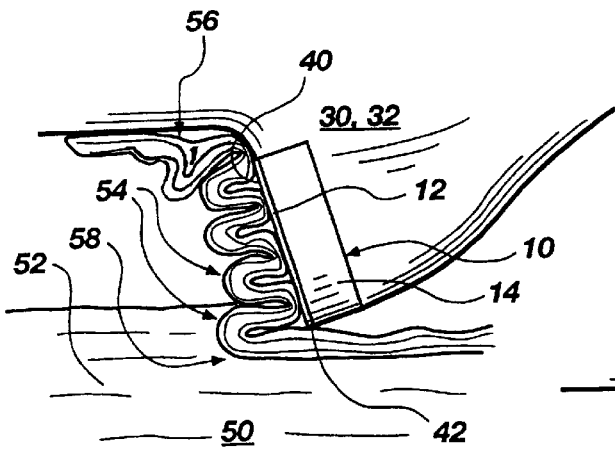
FIG. 3 is a side elevation of a prior art superhard cutting element as it engages and cuts a subterranean formation, depicting the manner in which formation chips cut from the formation can build up ahead of the cutting face and impede the cutting process and removal of chips from the cutting element.

Referring now to FIG. 3 of the drawings, a cutting element 10 is shown mounted on body 32 of a rotary drag bit 30 as drill bit 30 is inverted from the position shown in FIG. 2 and so oriented for drilling in a subterranean formation. Formation 50, which by way of example may be an aforementioned shale, such as a Catoosa shale, is being engaged by PDC cutting element 10, it being readily seen that the cutting edge 42 is impeded from engaging the pristine or completely uncut portion 52 of formation 50 by virtue of the large build-up of formation cuttings 54 ahead of cutting face 40 and under cutting edge 42. The irregular formation chip 56, which ultimately extends from the build-up 54 on the cutting face 40 of cutting element 10, is actually more or less extruded from the massive build-up of formation chips riding against the face 40 of PDC cutting element 10, and not cut directly from the formation 50, so failure of the formation material occurs at area 58.

It is thus readily apparent that this undesirable build-up of formation material in advance of the PDC cutting elements mounted across the face of the rotary drag bit impairs the cutting action of the PDC cutting element, as the cutting process can actually be effected by this built-up mass of cuttings moving ahead of the actual cutting element itself. As one might imagine, the formation chips are quite dull and cutting is effected in a manner which may be analogized to pushing a dull plow through damp earth, whereby earth is moved out of the way by the mere physical presence, mass and movement of the plow blade surface with an adhered compacted coating of earth, rather than the dirt clods being severed from the underlying earth by a sharp-edged plow blade. Thus, the normal force, or in real terms the weight on bit, which needs to be applied to the bit to effect a desired depth of cut and rate of penetration through the formation must be made undesirably and, in some cases, unreasonably high. In a similar manner, the tangential forces or the torque required to rotate the bit at the bottom of the borehole in such a situation is again undesirably increased, as the superhard cutting elements are merely moving the formation chips out of the way by sheer force, being unassisted by the relatively sharp cutting edge 42 of superhard cutting element 10. Stated another way, the required normal and tangential forces are both increased due to the large bearing area provided by the build-up of formation material at the cutting edge of the cutting element. The net result is an extremely inefficient rock cutting removal mode, which in some circumstances and in certain formations may actually cause a cessation of drilling.

Figure 4:
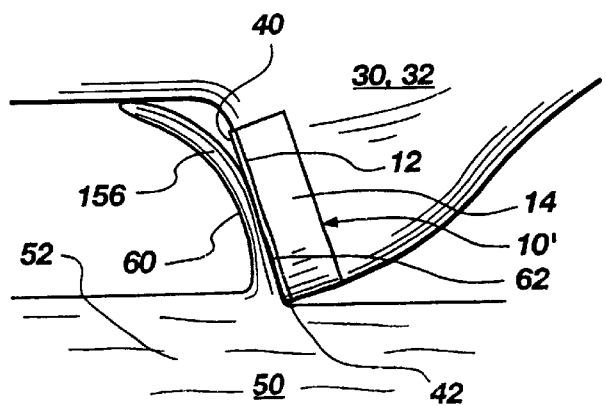
FIG. 4 is a side elevation of a superhard cutting element according to the present invention having a polished or mirror finish, depicting the continuous and uniform manner in which a formation chip is cut and removed from the formation without buildup ahead of the cutting face.

Referring now to FIG. 4 of the drawings, a cutting element 10' similar to cutting element 10 is depicted engaging and cutting the same subterranean formation 50. The substantial difference between the two cutting elements is that the cutting face 40 of the superhard cutting element 10' has been physically modified, as by polishing to a mirror finish of 0.5 μin. As illustrated, it will readily be seen that the cutting edge 42 of cutting element 10' is fully engaged with the pristine or previously uncut and undisturbed area 52 of subterranean formation 50, failure of the formation material occurring immediately adjacent cutting edge 42. Thus, cutting edge 42 is able to cut or shear a formation chip 156 from the formation in an unimpeded manner. As shown, formation chip 156, of substantially uniform thickness, moves relatively freely from the point of contact or line of contact from cutting edge 42 of cutting face 40 upwardly along the cutting face 40 until it breaks off either by contact with the body 32 of drill bit 30 or due to impact by drilling fluid emanating from a nozzle 38 on the face of the bit body 32, or fluid coursing through a channel on the face of the drill bit. Alternatively, a so-called "chip breaker", as known in the art, may be utilized directly above and adjacent cutting face 40 of superhard cutting element 10' for formation chip 156 to contact and fracture at the point of contact for removal by the drilling fluid to the surface. The polished or mirror finish provided on cutting face 40 of superhard cutting element 10' lowers the overall stresses applied to the rock in the cutting area and permits the formation chip 156 to ride smoothly due to reduced sliding friction in an unimpeded manner up the cutting face.

Referring to FIGS. 5A and 5B of the drawings, the difference in surface topography between the cutting face 40 of a prior art PDC cutting element 10 and that of a PDC cutting element 10' according to the present invention will be readily appreciated. FIGS. 5A and 5B comprise renderings as if a diamond or other superhard table were sectioned perpendicular to the cutting face, and not tracings of actual photomicrographs. In FIG. 5A, cutting face 40 of superhard diamond table 12 of prior art cutting element 10 is shown to contain microscopic "peaks" 100 and "valleys" 102 in the surface 104. Such minute elements may always be present, as well as large "ranges" or "waves" 106 and "canyons" or "troughs" 108 which comprise the major topographic features or perturbations on cutting face 40. It is these ranges or waves 106 and canyons or troughs 108 and not the much smaller microscopic peaks 100 and valleys 102 in surface 104 which provide or result in the 20–40 μin. surface roughness of the cutting face 40 of prior art cutting element 10. FIG. 5B, on the other hand, depicts how such waves or ranges 106 are of markedly reduced height and canyons or troughs 108 of markedly reduced depth in the cutting element 10' of the present invention. Broken line 110 provides a reference baseline within each superhard diamond table 12 from which to view the relative surface roughness of cutting element 10 and 10'. Thus, in microscopic terms, the surface smoothing which takes place in producing a cutting element in accordance with the present invention effects a modification and reduction of relatively large-scale features of the surface topography, and not an elimination of individual inclusions in and protrusions from the surface itself. Of course, some significant reduction in potential nucleation sites or flaw sites is achieved, as previously noted.

It might be expected in the case of the polished or mirror finished cutting face of superhard cutting element 10' that the differential pressure on the outer or leading side 60 (FIG. 4) of the formation chip 156, the side away from cutting face 40, and that on the inner side 62 on the formation chip 156 immediately abutting the cutting face 40, would cause formation chip 156 to strongly stick or adhere to the cutting face 40 due to the pressure differential. However, drilling laboratory tests have clearly shown that this is not the case, and that the smoothness and attendant reduced coefficient of friction of cutting face 40 substantially reduces the effect of the phenomenon of differential pressure sticking. Field tests of bits having polished cutting face PDC cutting elements have also confirmed the apparent dominance of the reduction of the coefficient of friction over the increase in differential pressure attributable to the smoothness of the cutting face.

Single point or single cutter cutting tests in drilling simulators have been performed with PDC cutting elements having a standard lapped finish and those which have been polished to a substantially mirror finish. In cutting tests employing General Electric Compax® cutters 9.2 mm square, backraked at an angle of 15°, performed on samples of Catoosa shale under a simulated down hole pressure of 9000 psi with a 0.005 inch depth of cut and a rotational speed of 273 rpm, the mirror finish cutting elements significantly outperformed the standard lapped finish cutting elements in terms of the force required to achieve a specified depth of cut and rate of penetration (ROP).

For example, in tests performed with these sharp, unchamfered PDC cutting elements, reduction in normal forces (weight on bit) of approximately 60% and reduction in tangential forces (torque) of 35% for the cutter with the polished diamond table were achieved. A second set of comparative single point cutting tests was run with polished and lapped cutting elements having a 0.010 inch by 45° chamfer ground on the cutting edge on each cutting element. These tests produced similar results in proportion to those of the first tests with the sharp, unchamfered edges, slight increases in the loads required to cut the formation being experienced due to the chamfered cutting edges of the cutting elements.

In addition to the relative reduction in normal and tangential loading experienced using polished cutting faces, there was also a marked difference in the appearance of the formation chips and kerf (trough left by the cutting element) produced during the cutting tests. The chips cut by the polished cutting face PDC cutting element were of substantially uniform thickness and substantially continuous appearance. In comparison, the formation chips cut by the standard or unpolished cutting element appear to have convoluted and built up on the cutting face of the cutting element (see FIG. 3) to a thickness two to three times the thickness of those cut by the polished cutting element before breaking loose from the built-up mass and then sliding up the face of the cutter. The kerf cut by the polished cutting element was very smooth, almost machined in uniformity, while the kerf cut by the standard lapped cutting element possessed an irregular profile and bottom surface.

More recently, tests of cutting elements according to the present invention in comparison to standard lapped finish cutting elements with non-plastic rock, specifically sandstone, have revealed a 100 percent increase in ROP. Thus, the polished cutting element of the present invention is believed to possess advantages when drilling sandstones, limestones and shales, as well as the previously-referenced plastic or ductile formations.

By way of example and not limitation, one mode currently known to the inventors for polishing the cutting face 40 of superhard cutting elements 10 to obtain cutting elements 10' of the present invention is lapping of the cutting face on conventional cast iron laps known in the art using progressively smaller diamond grit suspended in a glycol, glycerine or other suitable carrier liquid. The lapping is conducted as a three-step process commencing with a 70 micron grit, progressing to a 40 micron grit and then to a grit of about 1–3 microns in size. In contrast, standard lapping techniques for a prior art PDC cutting element 10, which may follow an initial electrodischarge grinding of the cutting face, finish lap in one step with 70 micron grit. By way of comparison of grit size, 70 micron grit is of the consistency of fine sand or crystalline material, while 1–3 micron grit is similar in consistency to powdered sugar.

However, it has also been established by the inventors that the normal 20–40 $\mu$in. surface roughness, averaging 30 $\mu$in., of state-of-the-art PDC cutting elements may be smoothed to the finish of the invention in a one-step process. The cutting elements, as received from the manufacturer, are placed with their cutting faces against a dry, rotating diamond wheel. A preferred wheel is the Winter RB778 resin bonded diamond wheel, offered by Ernst Winter & Sons, Inc. of Travelers Rest, S.C. It is important that the wheel be cooled as the diamond wheel is of resin bonded construction. Elevated temperatures would result in the destruction of the wheel. The nature of the polishing process requires that the abrasive surface be kept dry. However, the wheel may be moistened with water at the start of the polishing process to reduce drag and facilitate proper orientation of the PDC cutting faces against the wheel. In addition, the recommended temperature range, wherein polishing can be effected, is from 140° F. 220° F. While the polishers employed by the inventors rotate at 3500 RPM, it is believed that a range of from 3000–5000 RPM would likely be adequate. About 2 lb. to about 8 lb. force is applied to the cutting elements against the wheel. As noted below, it is preferred that the finish of the cutting faces be smoothed to a 0.5 $\mu$in. or less surface finish roughness approaching a true "mirror" finish. It takes about fifty minutes to an hour of polishing with the aforementioned diamond wheel to achieve this finish with a state-of-the-art nominal one-half inch diameter PDC cutting element cutting face, and one and one-half to two hours for a nominal three-quarter inch diameter PDC cutting face. The same methodology for polishing cutting faces may be applied to polish a chamfer at the cutting edge of the cutting face, as well as the side of the superhard table to the rear of the chamfer. To polish such surfaces, the cutting elements, held by their substrates, are disposed at the desired angle to the rotating wheel. The cutting elements are themselves rotated about their axis of symmetry to smooth and polish the desired chamfer and side areas of the superhard table.

Figure 8:
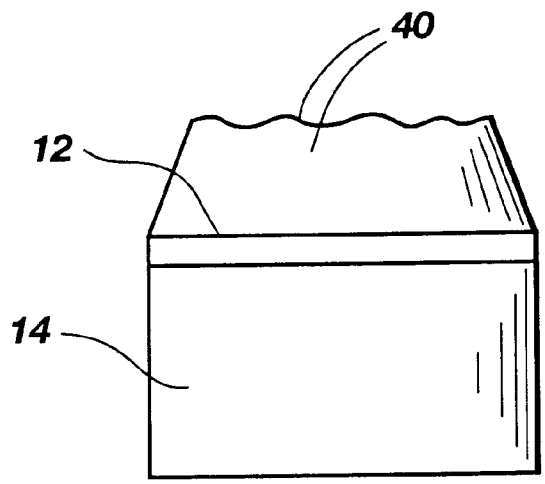
FIGS. 8 and 9 respectively depict cutting elements exhibiting nonlinear waved and nonlinear convex cutting surfaces.

In developing the above-described single-step smoothing and polishing technique, the inventors have come to appreciate that such technique appears to desirably reduce both the aforementioned ranges or waves 106 and canyons or troughs 108 in magnitude, as well as the perceived incidence and magnitude of smaller asperities, such as peaks 100 and valleys 102 (see FIGS. 5A and 5B). While state-of-the-art profilometers may be hard-pressed to quantitatively measure reduction of such "small" asperities, reflectivity measuring techniques developed by the inventors using laser light reflected from cutting faces of PDC cutting elements to a laser power meter have indicated that the quality of the preferred mirror finish cutting surface of the invention is governed to a certain extent by surface structures of different relative scales. As a consequence, it appears that reduction of the incidence and magnitude of "small" asperities in combination with removal and reduction of the larger asperities may further enhance finish quality. It should be appreciated, however, that the terms "large" and "small" as applied to such surface asperities are relative and used for purposes of mutual comparison only, all of such asperities being minute in the absolute sense relative to the dimensions of the cutting face, chamfer or other surface in question. Thus, as previously and subsequently mentioned herein, one could smooth and polish a curved, ridged, waved (see FIG. 8), or other cutting nonlinear face in accordance with the present invention to remove and reduce both large and small asperities, resulting in a mirror finish cutting face which nonetheless is not flat in the absolute sense.

It is also contemplated that the cutting element cutting surfaces (cutting face, chamfer, side, etc.) may be polished by other means, such as ion beams or chemicals, although the inherently inert chemical nature of diamond makes the latter approach somewhat difficult for diamond.

While an industry-standard PDC or other superhard cutting element typically has a lapped surface finish on the cutting face with irregularities or roughness (measured vertically from the surface) on the order of 20–40 $\mu$in., as a result of the above-described polishing, the most preferred embodiment of the superhard cutting element of the present invention possesses a cutting face surface finish of about 0.3 to 0.5 $\mu$in. or about 0.4 to 0.6 $\mu$in. roughness. It appears that a superhard cutting element surface finish with a substantially 10 $\mu$in. roughness provides some of the benefits previously described, although a substantially 2 $\mu$in. or less surface finish roughness is more preferred, and a substantially 0.5 $\mu$in. or less surface finish roughness approaching a true "mirror" finish is most preferred. The foregoing dimensional irregularities on the cutting face are measured using a calibrated Hommel America Model T-4000 diamond stylus profilometer contacting the cutting surface of the cutting element.

To quantify the results achievable by the present invention, when a PDC cutting element is polished to 0.5 $\mu$in. mirror finish, calculations based upon force data show the coefficient of friction to be reduced to about half, or fifty percent, of that of a 20–40 $\mu$in. standard finished, but otherwise identical, PDC cutting element. Thus, it can be said that reducing sliding contact stresses between the cutting face and formation chip can be defined macroscopically as achieving a low friction PDC, diamond or other superhard material table.

It has been proposed in the art (see U.S. Pat. No. 4,976,324) that a diamond film provides a smooth, low friction finish, either alone or as deposited on an underlying substrate, such as a PDC diamond table. However, the inventors have come to recognize that such is not necessarily the case, and that significant reductions in the coefficient of friction of even diamond film surfaces may be achieved by polishing as previously described. This is somewhat unexpected and surprising, since diamond already inherently has one of the lowest known coefficients of friction of any material. While in some cases the reduction in friction achieved by polishing a diamond film may not be as phenomenal as that noted above with respect to polished versus lapped PDC cutting elements, it is nonetheless substantial and demonstrable.

Another observed benefit of polishing a superhard cutting element cutting face to a surface finish in the above-referenced beneficial range of 10 $\mu$in. surface finish or finer is the marked reduction in degradation of the cutting face in use. Unlike temporary surface coatings or coverings used in the prior art (see U.S. Pat. Nos. 5,135,061 and 5,025,874), to protect diamond tables while tripping a bit into the borehole and during the first few minutes of drilling, the polished superhard cutting face of the present invention retains its robust characteristics after many hundreds of feet of drilling.

Figure 9:
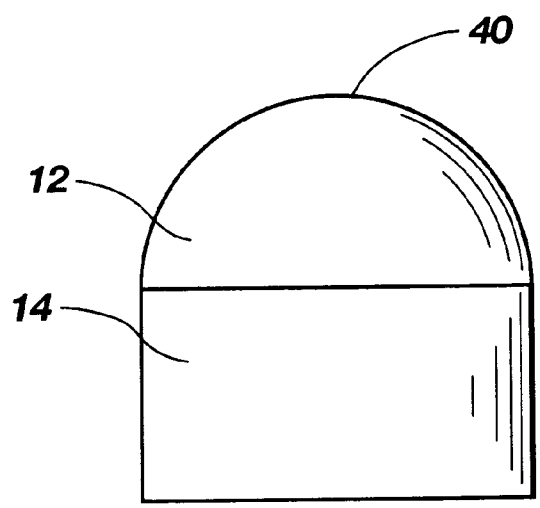

While the present invention has been described with reference to individual cutting elements mounted at separate locations on a bit face, it is contemplated that the invention has equal utility with blade-type bits wherein very large cutting faces are presented to engage the formation such as those described in the aforementioned U.S. Pat. No. 4,883,132 to Tibbitts and U.S. Pat. No. 4,913,247 to Jones, assigned to the assignee of the present invention and incorporated herein by reference. Such cutting faces may be formed as Mosaic® cutters, or may be fabricated from adjacent round, square or otherwise shaped individual cutting elements of the same or different material, closely spaced and with cooperative or even interlocking borders. As noted previously, convex (see FIG. 9), concave or other arcuately-surfaced cutting elements may be polished, as may the alternate geometry (stepped, ridged, waved, etc.) cutting element surfaces described in some of the previously-referenced prior art.

It is also contemplated that sides and chamfers of superhard material tables of cutting elements may be processed to enhanced smoothness according to the present invention, and that the benefits observed from polished cutting faces will be further amplified. FIGS. 6A–6C of the drawings depict cutting elements 10' according to the present invention in which the chamfer 24 and side surface 26 of the diamond table have been polished, at least in the portion of the cutting element periphery which will engage the formation. FIGS. 6A–6C also illustrate an embodiment of the invention wherein only a segment or portion 140 of cutting face 40 has been smoothed or polished. When only a portion of the cutting face, side or chamfer is polished, polishing time may be reduced and the unpolished portion of the cutting face may act as a chip breaker when the formation chip encounters the unpolished area of substantially greater frictional coefficient.

Figure 7:
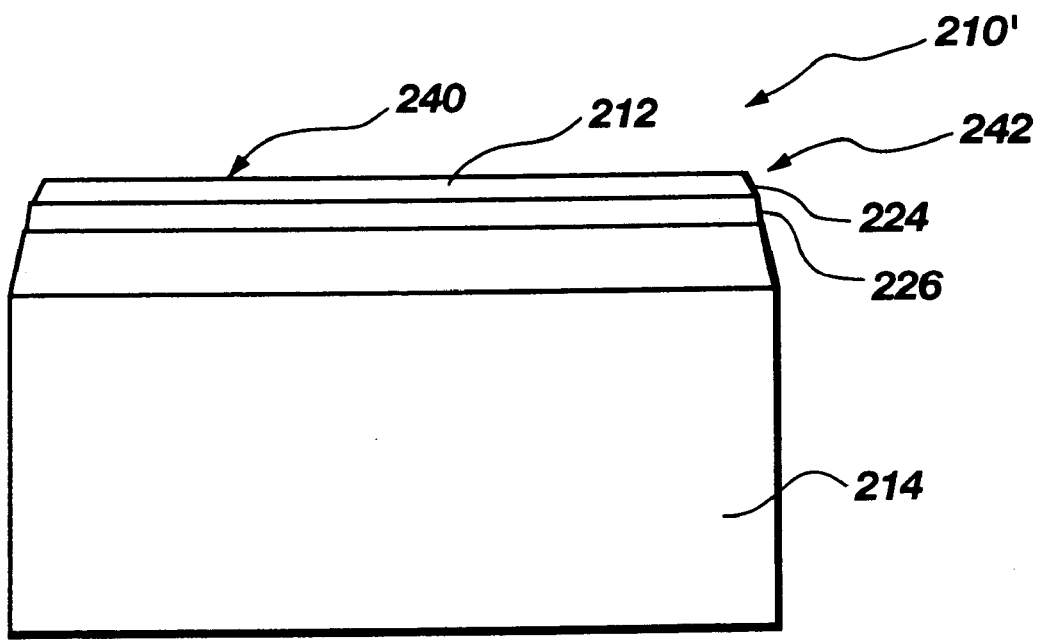
FIG. 7 is an enlarged side elevation depicting a cutting element including a chamfered cutting edge and a tapered side surface extending from the chamfer along the side of the superhard material table and substrate supporting the table, at least a portion of the cutting face, chamfer, table and substrate sides being polished.

FIG. 7 of the drawings depicts a more specific structural embodiment of the present invention by illustrating a cutting element 210' of a design developed by the assignee of the present invention and disclosed and claimed in U.S. patent application Ser. No. 08/039,858, now U.S. Pat. No. 5,460,233, assigned to the present assignee and incorporated herein by reference. Cutting element 210' includes a cutting face 240 bounded by a chamfer 224 at the cutting edge 242, and a tapered or frustoconical side surface 226 on the diamond (PDC) table 212, the taper of the side surface 226 of diamond table 212 extending along the exterior side surface of the substrate 214 which supports the diamond table 212. At least a portion of the cutting face 240, chamfer 224 and side surface 226 of cutting element 210' (those portions actively engaged with the formation to cut same) are polished in accordance with the present invention.

In wear testing of cutting elements of the general configuration of element 210', it has been observed by the inventors that the smoother the surface finish of the chamfer and of the tapered side surface, the more durable the cutter, as determined by onset of cutter wear. Recent experiments on a rock planer that were designed to evaluate the relative durability of PDC cutting elements suggest the durability is sensitive to the surface finish of the area of the diamond table (including chamfer and side) actually contacting the rock. These observations were made using cutting elements that had variations in surface finish resulting from slight variations in the finishing process, and not of cutting elements having polished chamfers or sides per se. However, it appears that an improved surface finish which might be achieved by polishing would reduce microfracture and abrasive wear of the diamond table, abrasive wear being related to microfracture, while the converse is not necessarily true. While the surface of the diamond table does not form a "skin," nonetheless a smooth diamond table surface may be analogized to a protective skin which inhibits deterioration of the diamond table during the cutting process. Therefore, it is specifically contemplated that the polishing of the chamfer 224 and tapered side surface 226 of such cutting elements be effected when the cutting face 240 is polished. Preferred surface finish roughnesses for polished chamfer and side surface portions have yet to be conclusively established, but are currently believed to coincide with those previously disclosed with respect to cutting faces.

It is further contemplated that cutting element mounting structures and high erosion- and abrasion-susceptible areas on the bit body, such as waterways 70 and junk slots 72, as illustrated in FIG. 2 of the drawings, may also benefit in terms of integrity and longevity from polishing to an extremely fine surface finish.

While the present invention has been described in terms of certain preferred embodiments, it is not so limited, and those of ordinary skill in the art will readily recognize and appreciate that many additions, deletions and modifications to the embodiments described herein may be made without departing from the scope of the invention as hereinafter claimed.

What is claimed is:

1. A cutting structure for drilling subterranean formations, comprising:
    a substrate having an interface surface thereon; and
    a table of superhard material disposed on the interface surface and exhibiting a cutting surface including at least a portion having a polished finish.

2. The cutting structure of claim 1, wherein the substrate is substantially circular in cross-section.

3. The cutting structure of claim 1, wherein the cutting surface of the table is nonlinear.

4. The cutting structure of claim 3, wherein the cutting surface of the table is arcuate.

5. The cutting structure of claim 4, wherein the cutting surface of the table is convex.

6. The cutting structure of claim 1, wherein a boundary between the table and the substrate along at least a portion of the interface surface is irregular.

7. The cutting structure of claim 1, wherein the substrate comprises tungsten carbide and the superhard material comprises diamond.

8. The cutting structure of claim 7, wherein the diamond comprises a polycrystalline diamond compact.

9. The cutting structure of claim 1, wherein the substrate is substantially circular in cross-section and comprises tungsten carbide, the interface surface is located on an end of the substrate, the superhard material comprises a polycrystalline diamond compact, and the cutting surface of the table is nonlinear.

10. The cutting structure of claim 9, wherein the cutting surface of the table is convex.

11. The cutting structure of claim 9, wherein a boundary between the table and the substrate along at least a portion of the interface surface is irregular.

12. The cutting structure of claim 1, wherein the at least a portion of the cutting surface exhibits a surface finish of about 10 μin. or less roughness.

13. The cutting structure of claim 1, wherein the at least a portion of the cutting surface exhibits a surface finish of about 2 µin. or less roughness.

14. The cutting structure of claim 1, wherein the at least a portion of the cutting surface exhibits a surface finish of about 0.5 µin. or less roughness.

15. The cutting structure of claim 1, wherein the superhard material of the table comprises a material selected from the group consisting of PDC, TSP, diamond film and cubic boron nitride.

16. The cutting structure of claim 1, wherein the table includes a side surface tapered laterally outwardly toward the substrate.

17. The cutting structure of claim 16, wherein said laterally outward taper of said side surface portion of the table is extended on a side of the substrate adjacent thereto.

18. A bit for drilling subterranean formations, comprising:
a bit body having a shank secured thereto for connection of the bit to a drill string;
a plurality of cutting structures carried by the bit body, at least one of the cutting structures comprising:
a substrate having an interface surface thereon; and
a table of superhard material disposed on the interface surface and exhibiting a cutting surface including at least a portion having a polished finish.

19. The bit of claim 18, wherein the substrate is substantially circular in cross-section.

20. The bit of claim 18, wherein the cutting surface of the table is nonlinear.

21. The bit of claim 20, wherein the cutting surface of the table is arcuate.

22. The bit of claim 21, wherein the cutting surface of the table is convex.

23. The bit of claim 18, wherein a boundary between the table and the substrate along at least a portion of the interface surface is irregular.

24. The bit of claim 18, wherein the substrate comprises tungsten carbide and the superhard material comprises diamond.

25. The bit of claim 24, wherein the diamond comprises a polycrystalline diamond compact.

26. The bit of claim 18, wherein the substrate is substantially circular in cross-section and comprises a carbide, the interface surface is located on an end of the substrate, the superhard material comprises a polycrystalline diamond compact, and the cutting surface of the table is nonlinear.

27. The bit of claim 26, wherein the cutting surface of the table is convex.

28. The bit of claim 26, wherein a boundary between the table and the substrate along at least a portion of the interface surface is irregular.

29. The bit of claim 18, wherein the at least a portion of the cutting surface exhibits a surface finish of about 10 µin. or less roughness.

30. The bit of claim 18, wherein the at least a portion of the cutting surface exhibits a surface finish of about 2 µin. or less roughness.

31. The bit of claim 18, wherein the at least a portion of the cutting surface exhibits a surface finish of about 0.5 µin. or less roughness.

32. The bit of claim 18, wherein the superhard material of the table comprises a material selected from the group consisting of PDC, TSP, diamond film and cubic boron nitride.

33. The bit of claim 18, wherein the table includes a side surface tapered laterally outwardly toward the substrate.

34. The bit of claim 33, wherein the laterally outward taper of the side surface portion of the table is extended on a side of said substrate adjacent thereto.

35. A cutting structure for drilling subterranean formations, comprising:
a substrate having an interface surface thereon; and
a table of superhard material disposed on the interface surface and exhibiting a cutting surface including at least a portion having a substantial mirror finish.

36. The cutting structure of claim 35, wherein the table includes a side surface including at least a portion having a substantial mirror finish.

37. A bit for drilling subterranean formations, comprising:
a bit body having a shank secured thereto for connection of the bit to a drill string;
a plurality of cutting structures carried by the bit body, at least one of the cutting structures comprising:
a substrate having an interface surface thereon; and
a table of superhard material disposed on the interface surface and exhibiting a cutting surface including at least a portion having a substantial mirror finish.

38. The bit of claim 37, wherein the table includes a side surface including at least a portion having a substantial mirror finish.

* * * * *

UNITED STATES PATENT AND TRADEMARK OFFICE
CERTIFICATE OF CORRECTION

PATENT NO. : 6,145,608
DATED : November 14, 2000
INVENTOR(S) : Jeffrey B. Lund, Redd H. Smith and Trent N. Butcher It is certified that error appears in the above-identified patent and that said Letters Patent is hereby corrected as shown below:

Title page,
Item [56], References Cited, U.S. PATENT DOCUMENTS,
after "4,646,857" insert -- an asterisk --;
after "5,447,208" insert -- an asterisk --;
after "5,469,927" insert -- an asterisk --;
after "5,648,119" insert -- an asterisk --;
after "5,653,300" insert -- an asterisk --;
after "5,669,271" insert -- an asterisk --;
after "5,722,499" insert -- an asterisk --;
after "5,823,277" insert -- an asterisk --;
after "5,967,250" insert -- an asterisk --; and
after "5,992,549" insert -- an asterisk --.
After the last reference on the Title page, skip a line and insert -- *cited by examiner --.

Column 2,
Lines 54 and 55, change "TSP's" to -- TSPs --.

Column 3,
Lines 51 and 52, change "TSP's" to -- TSPs --.

Column 7,
Line 11, change "and undisturbed area" to -- portion --.

Column 9,
Lines 11 and 12, change "70 micron grit" to -- 70 micron grit --.
Line 32, change "F. 220° F." to -- F - 220° F --.

Signed and Sealed this

Twenty-first Day of February, 2006

JON W. DUDAS
*Director of the United States Patent and Trademark Office*